Jan. 23, 1940.    R. SENSAUD DE LAVAUD    2,187,937
HYDRAULIC DEVICE FOR TRANSMITTING MOVEMENT
Filed April 22, 1933    3 Sheets-Sheet 1

INVENTOR
Robert Sensaud de Lavaud.
ATTORNEYS

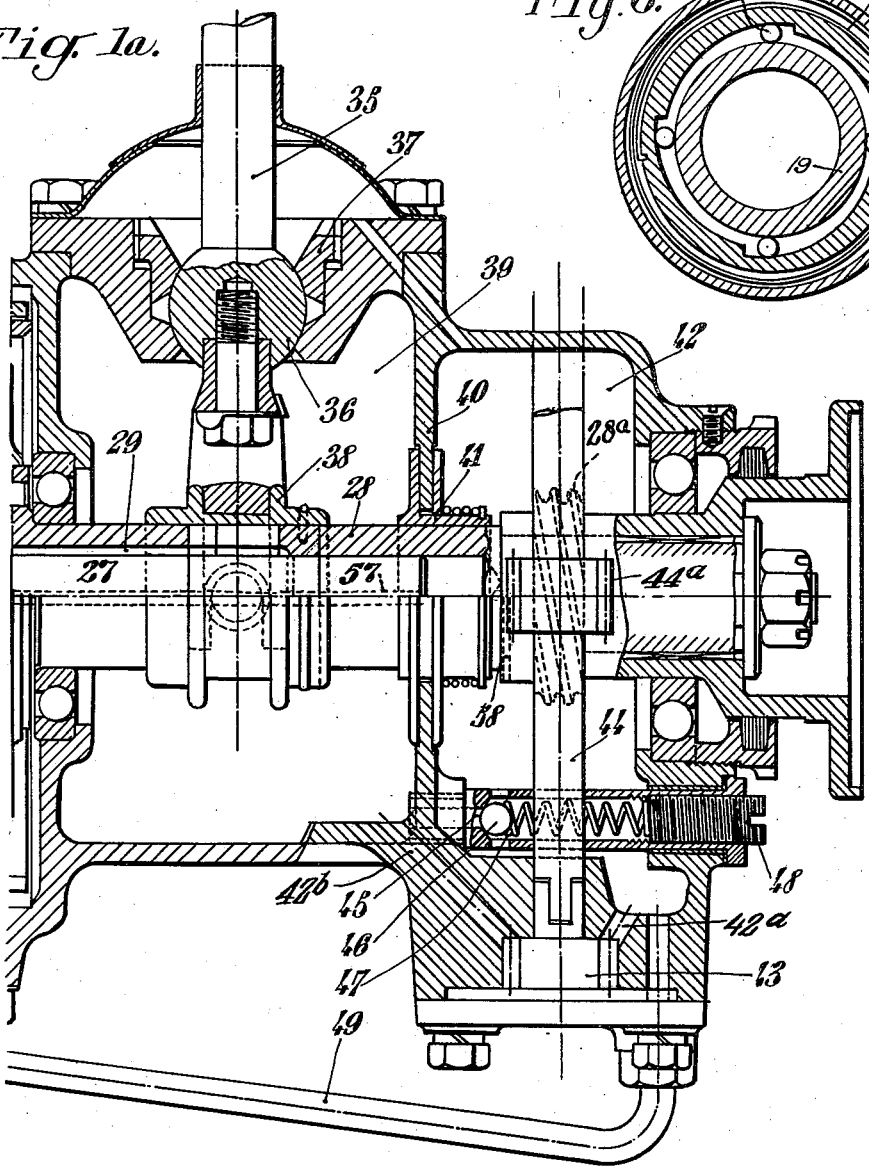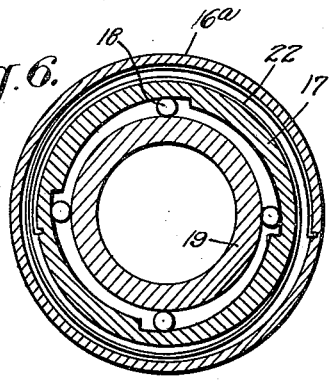

Jan. 23, 1940.  R. SENSAUD DE LAVAUD  2,187,937
HYDRAULIC DEVICE FOR TRANSMITTING MOVEMENT
Filed April 22, 1933  3 Sheets-Sheet 3
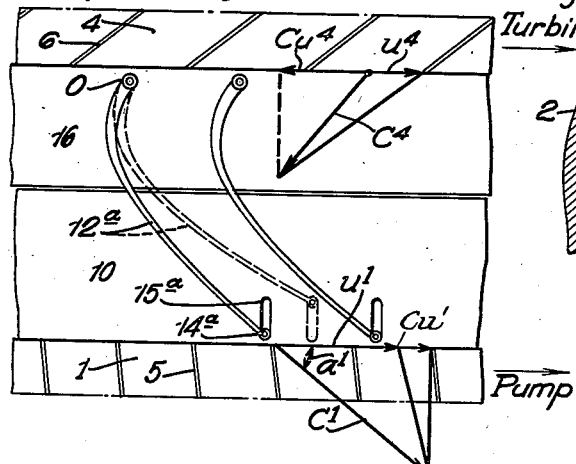
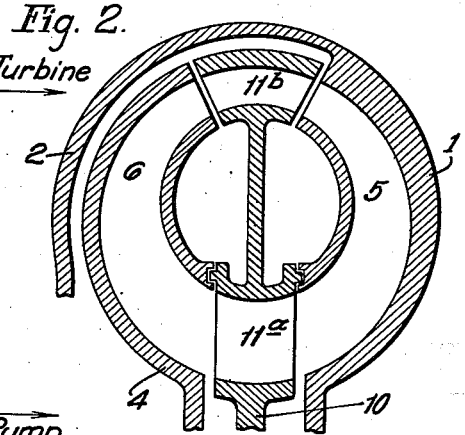
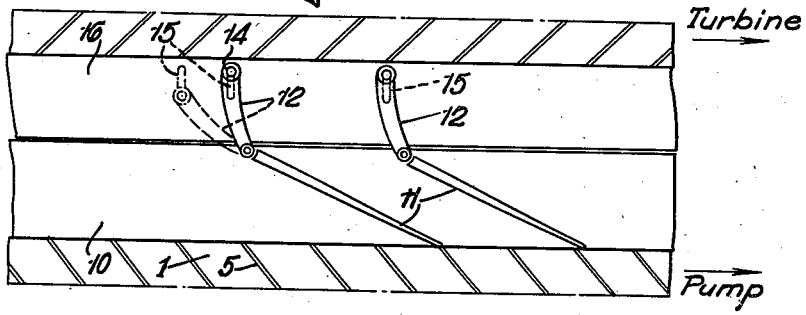
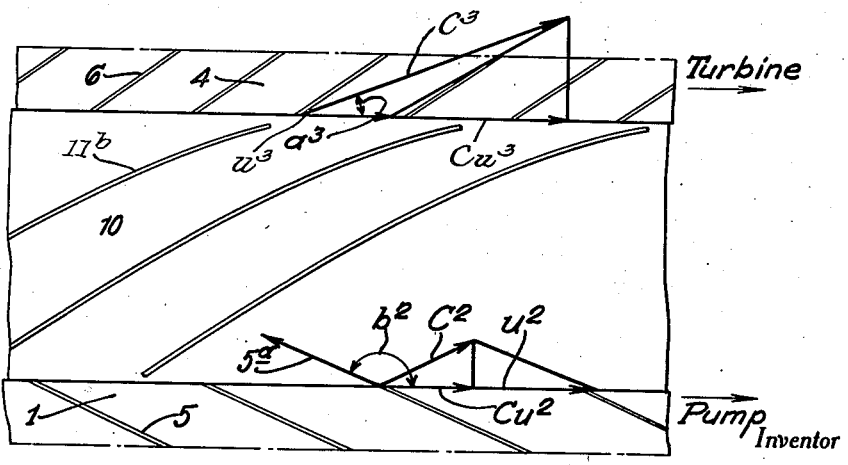
Inventor
ROBERT SENSAUD DE LAVAUD.
By Usina & Rauber
Attorneys Patented Jan. 23, 1940

2,187,937

UNITED STATES PATENT OFFICE 2,187,937

HYDRAULIC DEVICE FOR TRANSMITTING MOVEMENT

Robert Sensaud de Lavaud, Paris, France, assignor to Dimitri Sensaud De Lavaud, Paris, France Application April 22, 1933, Serial No. 667,408
In France April 23, 1932

2 Claims. (Cl. 60—54)

The invention aims to provide certain improvements by which hydraulic devices for transmitting movement are made to operate smoothly and efficiently and with a minimum of friction and by which other advantages are secured as stated in detail hereinafter.

The improved device is particularly adapted as a transmission for automobiles, being applicable to other uses also. The transmission includes an hydraulic pump, referred to herein generally as a pump, and a receiver referred to herein generally as a turbine, and certain devices for automatically controlling their action and reaction on each other.

The accompanying drawings illustrate embodiments of the invention.

Fig. 2 is a longitudinal section of the outer portion of the pump, turbine and adjacent parts, illustrating a modification;

Fig. 3 is a diagram in a developed horizontal section showing the vanes of the pump and of the turbine and of the intermediate redirecting or controlling device arranged between the turbine outlet and the pump inlet;

Fig. 4 is a similar view of a modification in which the redirecting or controlling device is located between the pump outlet and the turbine inlet;

Fig. 5 is a similar view of the particular arrangement corresponding to Fig. 1; in which the redirecting means is between the turbine outlet and the pump inlet.

Fig. 6 is a cross-section of a spring connection and free wheeling assembly for the redirector.

Figure 1:
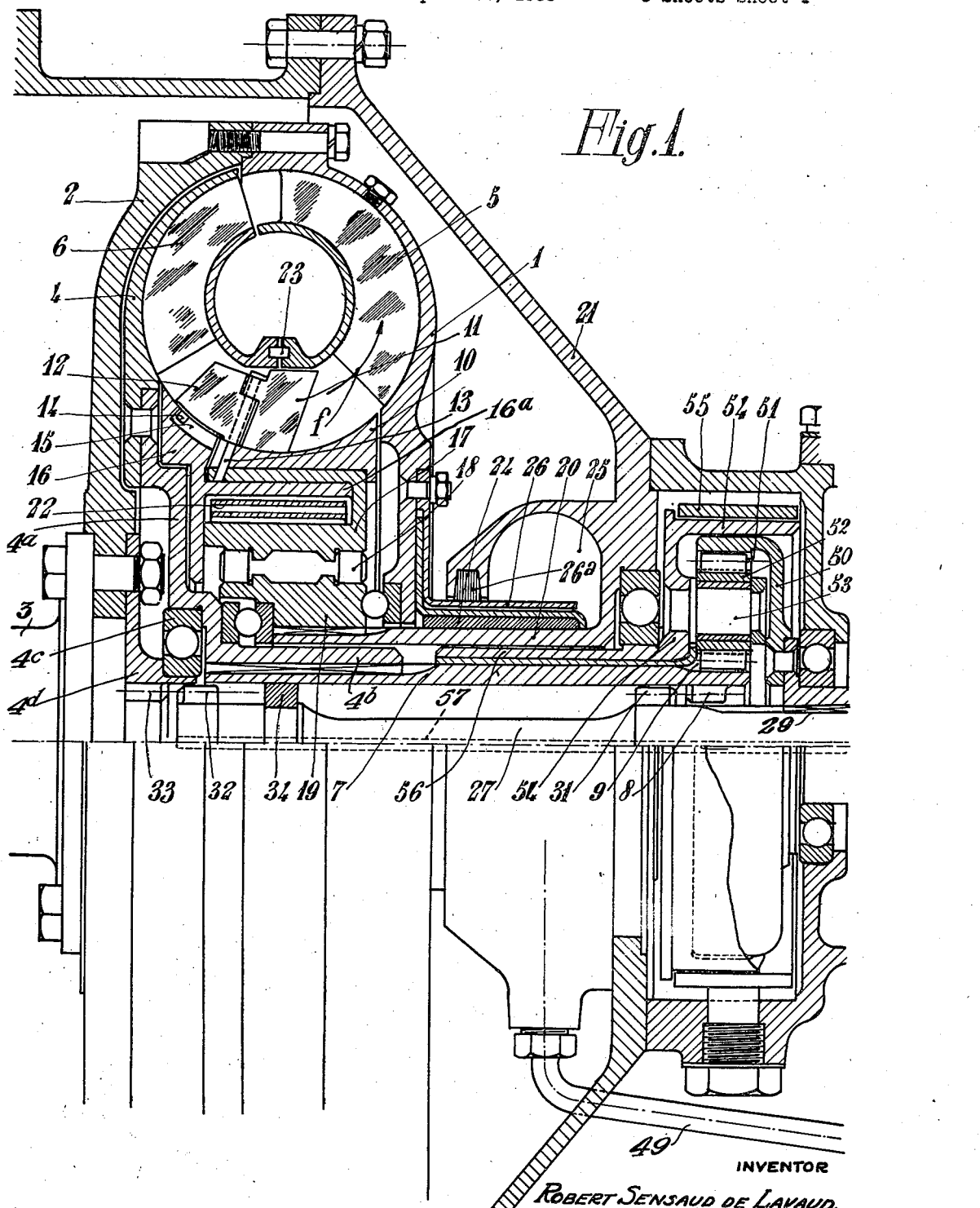
Fig. 1 is the left end, and Fig. 1a the right end, of a longitudinal section (partly in elevation) of the complete apparatus.

The pump is fixedly connected to the motor shaft or driving shaft. The turbine is fixed to a driven shaft which is co-axial with the driving shaft. These two devices are of annular form surrounding the axis of the shafts. Between them there is an annular device which we call a redirector provided with vanes which redirect the flow of the oil or other liquid between the pump and the turbine. The redirector may be of various designs and of various relations to the other parts and may be either rigidly held in position or may be free to rotate with the pump and the turbine.

The drawings illustrate the casing or shell 1 of a centrifugal pump carrying vanes 5 and bolted to a plate 2 which in turn is bolted to the driving shaft 3. The arrow $f$ shows the point of entry and direction of the oil into the pump. Fig. 5 is a section at approximately the point of entrance and shows the inclination of the vanes 5 (which inclination may be varied as shown in modifications referred to hereinafter).

The turbine has a shell 4 with vanes 6 inclined for example as illustrated in Fig. 5. The shell of the turbine is riveted to a flange $4^a$ of a tube $4^b$ which is rotatably mounted on bearings $4^c$ carried by a tubular extension $4^d$ from the plate 2. The part $4^b$ is keyed to a sleeve 7 having at its right-hand end a ring of internal claws 8 and a ring of external gear teeth 9. The turbine, therefore, rotates the sleeve 7 which may be clutched directly to the driven shaft or connected to the latter for reverse rotation.

The vanes of the pump may be fixed as illustrated or other known or suitable constructions may be used. The casing of the pump acts as a fly-wheel. By fixing the vanes directly thereon there is economy of construction and also a lessened friction as compared with designs in which the complete coupling is arranged to rotate in a separate casing. The casing of one of the rotary devices, the shell of the pump in the construction illustrated, forms the fluid-tight housing of the parts.

Between the entry to the vanes 5 of the pump and the exit from the vanes 6 of the turbine, are disposed the vanes of a redirector 10. Each of these vanes is made of two parts, a fixed part 11 situated at the pump entry side, and a part 12 at the opposite side which is movable about a pivot pin 13 which is normal to the wall of the redirector.

The parts 12 are moved by the oil against an elastic resistance, such that the restoring effort is substantially proportional to the moment of the force which is applied to the vanes or movable parts 12. For this purpose, Figs. 1 and 5 show the movable end of the part 12 carrying a lug 14 which lies in a groove 15 which lies in a plane approximately parallel to the axis of the main shaft and is formed in the periphery of a drum 16 which has a tubular portion $16^a$ fitting freely into an annular recess in a ring 17 which carries the body 10 of the redirector and which forms a member of a free-wheeling assembly the other parts of which are the rollers 18 and the ring 19 keyed to the sleeve 20 which is integral with the external shell 21 in which the unit is carried. The inner surface of the ring 17 is so shaped, as shown in Fig. 6, as to enable it to rotate freely in one direction but to lock the rollers 18 between the rings 17 and 19 and prevent the ring 17 from rotating in the opposite direction. The rings or drums 16ª and 17 are connected to each other by elastic restoring devices 22 (springs for example) which tend to press the part 16 to the right in Fig. 5, with relation to the part 10, and to hold the movable parts 12 of the vanes in the full line position shown. The force of the springs is proportional at any instant to that of the oil on the movable parts of the vanes A tight joint 23 is provided between the inner portions of the shells of the pump and the turbine, so that a tight enclosure for the vanes of the redirector is obtained.

The connection between the rotating members and the fixed parts is made tight by the use of floating joints. Oil leaking out of these joints is caught in chambers which are not under pressure and which are in turn brought into communication with the chamber or spaces which are in communication with the suction end of the pump, with an adjustable outlet valve, hereinafter referred to, between the discharge from the chambers not under pressure and the suction end of the pump.

The fixed tubular part 20 carries a floating joint ring 24 around the outside of which is a tubular extension 26 which is rigidly and tightly fastened to the shell 1 of the pump, and which in turn rotates within a packing ring 26ª carried by the shell of a receptacle 25 formed in this part of the outer casing 21. Any oil escaping from the pump enclosure passes into the chamber 25 and out of the bottom of it through a pipe 49.

Within the sleeve 7 is a sliding shaft 27 which at its right-hand end is splined to a surrounding hollow driven shaft 28 by means of a key 29. This shaft 27 has a ring of claws 31 adapted to co-operate with the claws 8 in the sleeve 7 (which is keyed to the part 4ᵇ of the turbine). The shaft 27 has also a ring of claws 32 adapted to co-operate with the internal ring of claws 33 formed on the part 4ᵈ which is fixed on the driving shaft. The shaft 27 is shown in the neutral position. It may be shifted to the right to connect it with the sleeve 7 and the turbine, or to the left to connect it with the part 4ᵈ and the driving shaft. The shaft 27 is guided at its left end by a bearing ring 34 engaging the interior of the sleeve 7.

The shifting of the sliding shaft is effected by means of a lever 35 (Fig. 1a) having a spherical pivot 36 held in place by a packing 37. The inner end of the lever carries a fork 38 which engages and shifts the shaft 27 in the usual way.

The chamber 39 in which the fork is located is subjected to the pressure of the oil. Its wall 40 is arranged to make an oil-tight connection around the driven shaft 28 by means of a floating ring 41. The chamber 42 will receive any oil escaping from the chamber 39 and also (through the pipe 49) any oil escaping from the chamber 25.

In the lower part of the chamber 42 a pump 43 (of the gear type for example) draws the oil from the bottom of the chamber 42 by way of a port 42ª and forces it through a port 42ᵇ back into the chamber 39. The pump may be driven by any suitable means, such for example, as worm gears of which one, 44ª, is keyed on the shaft 44 of the pump, and the other, 28ª, is keyed on the driven shaft 28.

The pressure within the chamber 39 is limited by means of an adjustable valve. A passage 45 between the lower ends of the chambers 39 and 42 is normally closed by a ball valve 46 held on its seat by a spring 47 which is adjustable by means of a screw 48. When the pressure in the chamber 39 becomes excessive under the action of the pump 43, this valve permits oil to pass out of the chamber 39 into the chamber 42.

By this arrangement of chambers, gear pump and pressure recuperator and the floating joints described, the oil contained within the device is maintained under proper pressure so as to compensate for leakage and to prevent any cavitation or voids in the body of oil supplied to the driving pump 1.

The sliding shaft 27 has a central axial bore 57 open at the left end and communicating at the right end with a capillary passage 58 leading from the center of the shaft within the space of the suction chamber 42. Any air in the center of the system will thus be drawn through the bore 57 and expelled by centrifugal force into the chamber 42 from which it can escape after depositing in said chamber any small quantities of oil which it may carry.

A planetary gearing and braking system is provided. On the left end of the driven shaft 28 is the planetary or differential gearing which connects it with the sleeve 7 which is rotated by the turbine. On the end of the shaft 28 there is fixed a drum 50 which has internal gear teeth 51 located in the same plane as the external gear teeth 9 on the sleeve 7. Between these two gears are pinions 52 meshing with the gears and mounted idly on their shafts 53 which are arranged in a ring in the lateral face of a spider with a flange 54 constituting a brake drum. Surrounding this is a brake jaw 55 which may be actuated by the usual brake pedal. The central part of the spider is extended axially to form a sleeve 56 mounted to rotate on the sleeve 7.

The mode of operation is as follows:

The sliding shaft 27 is assumed to be in the intermediate position in which neither of the two rows of claws is in engagement. If the driving shaft 3 starts under the action of the motor for example, it rotates the pump 1 and the fluid is actuated by centrifugal force and displaces itself in the direction of the arrow f through the vanes of the pump. It then passes into the vanes of the turbine 4. The wings of the redirector guide the fluid at exit from the vanes of the turbine to send it back into the vanes of the pump, thus flowing in a closed cycle. In this movement, owing to the shape of the vanes shown diagrammatically in Fig. 5, it is seen that the turbine 4 is rotated in the same direction as the pump 1. At the instant when the speeds of rotation of the pump and the turbine become the same, the oil flows in reduced volume or output, and the redirector 10 finds itself driven in the same direction as the turbine 4 and the pump 1 through the rings 17 and 19 and the rollers 18.

On starting, the residual speed of the fluid at exit from the wings of the turbine 4 is a maximum and this fluid acts on the movable part 12 of the wings of the redirector 10 which yields to the shock and takes up the position shown in dotted lines in Fig. 5. The sleeve 16 turns relatively to the sleeve 17 of the redirector against the resistance of the elastic restoring devices 22. This movement is shown by comparison between the full line and the dotted line positions of the part 12 in Fig. 5.

As the speed of the turbine 4 increases, the exit speed of the fluid lessens as well as the thrust on the movable part 12 of the wings which tend, under the influence of the springs 22, to come back towards the position shown in full lines in Fig. 5. This position will be obtained when the speeds of the turbine 4 and of the pump 1 are the same.

The turbine 4, in turning, drives the sleeve 7, the pinions 52 roll on the external teeth 9 of this sleeve, the drum 54 carrying their shafts being idle, and the driven shaft remains at rest. If the claws 8 of the sleeve 7 are engaged with the claws 31 of the sliding shaft 27, it is seen that the driven shaft 28 is thus rotated in the same direction as the driving shaft.

The driven shaft having reached the speed of the driving shaft, at this instant, the sliding shaft 27 may be shifted to the left and its claws 32 engaged with the claws 33 of the driving shaft, thus causing the driven shaft 28 to be directly driven.

By restoring the sliding shaft 27 to the intermediate position where the rows of claws 31 and 32 are no longer in engagement, and operating the pedal actuating the jaw 55 of the brake, the speed of the drum 54 carrying the shafts of the planet pinions 52 is reduced and the driven shaft 28 is driven in the opposite direction to the driving shaft, thus obtaining the reverse drive.

In the two cases of forward drive if the jaw 55 of the brake is tightened, a direct braking on the driving shaft is obtained and therefore on the motor.

The invention may be embodied in many other forms than that illustrated. The following examples are not intended to be limiting in this respect.

The distributor or redirector 10 may, as illustrated in Fig. 2, be provided with two rows of vanes 11$^a$ and 11$^b$; the former located between the turbine exit and the pump inlet, and the latter between the pump exit and the turbine inlet.

The vanes of the distributor (whether of the type of Fig. 1 or of that of Fig. 2) may be fixed or may be wholly movable or may be partly movable.

In Fig. 3 there is illustrated a distributor 10 with vanes 12$^a$ each of which is pivoted to a fixed point at one end and has at the opposite end a pin 14$^a$ entering a slot 15$^a$ in the part 10 which is rotatable relatively to the part 16 which carries the fixed pivot. The arrangement of Fig. 3 is illustrated in a design suitable to be placed at the entry to the vanes of the pump, like the design of Fig. 5. But the same principle of vanes entirely movable may be applied to a redirector at the opposite end of the pump.

Fig. 4 shows the use of fixed vanes 11$^b$ and illustrates a design for a redirector placed at the exit end of the pump vanes. But the same principle of fixed vanes in the redirector may be applied to one placed at the opposite end.

It has been previously proposed to use a concentric centrifugal pump-turbine combination as an hydraulic coupling or transmission between a motor and receiver. Where a single turbine has been used it has generally had the same angular speed as the pump. Different speeds have been provided in the case of two turbines in series with fixed guides between them. With all of these known combinations, as far as I am aware, it has been possible to increase the moment of the force on the turbine, when the load on it is increased, without also increasing the moment of the driving force applied to the pump, the increased load being compensated by a reduction in speed of the turbine. But this reduction in speed of the turbine is accompanied by losses in the efficiency with which the pressure is transmitted through the system.

With the present invention such losses of efficiency are avoided. When the moment of the force applied to the turbine increases to take care of an increased load, the regulator modifies the relation of the forces within the combination so that the efficiency remains as great as possible and so that the motor which drives the pump can remain under a constant or only slightly variable load. In explanation of this, I have indicated the triangles of forces in Fig. 3 (entry to pump and exit from turbine) and in Fig. 4 (exit from pump and entry to turbine).

The effective moment of the force applied to the pump is the moment at the exit minus that at the entry; each moment, of course, being the output of oil passing the point in question, multiplied by the tangential component of its velocity and by the radius of the pump at that point. The force is proportional to the speed of the flow. Therefore, if the speed of the pump itself at this point is $u^2$ (Fig. 4) and absolute exit speed of oil from the pump is $C^2$, the tangential speed of the oil is $Cu^2$. This multiplied by the exit radius (which we call $r^2$) gives us $Cu^2r^2$ as the measure of the exit moment, which has to be multiplied by the weight or output of oil at any instant, to determine the moment of the forces at this point.

Similarly at the pump entrance, $u'$ (Fig. 3) is the speed of the pump itself, $C'$ the absolute entrance speed of the oil and $Cu'$ the tangential entrance speed of the oil. This multiplied by the radius ($r'$) gives us $Cu'r'$ as the measure of the moment of the force with which the oil enters.

Therefore, the net moment for the pump is the volume or output of oil multiplied by the difference between $Cu^2r^2$ and $Cu'r'$.

Similarly the moment of the forces on the turbine is proportional to the difference between the moments of the forces acting at the entrance and exit respectively of the turbine.

If at the entrance to the turbine (Fig. 4) the speed of the turbine itself is $u^3$ and the speed of the fluid is $C^3$, the tangential entrance speed of the fluid is $Cu^3$. This multiplied by the radius ($r^3$) at this point gives the moment of the force as $Cu^3r^3$.

Similarly for the exit from the turbine, we have the turbine speed $u^4$ (Fig. 3), the absolute speed of the fluid $C^4$ and the component or projection thereof $Cu^4$. This multiplied by the radius ($r^4$) gives us the moment at this point $Cu^4r^4$. And the net moment on the turbine is proportional to the difference, $Cu^3r^3 - Cu^4r^4$, multiplied, of course, by the output of fluid.

We can increase the moment of the forces acting on the turbine while retaining approximately constant the net moment of the force exerted by the pump, by increasing the output of the pump, if at the same time we make a corresponding variation in the quantity $Cu^2r^2 - Cu'r'$. Since the radii remain constant, we can secure this result by varying the relation between the quantities $Cu^2$ and $Cu'$, which represent the tangential projections of the exit speed and entrance speed respectively of the oil into and out of the pump. This may be done in three ways:

1. $Cu'$ must increase, or
2. $Cu^2$ must decrease, or
3. Both these changes must take place.

Furthermore, the moment of the forces on the turbine being necessarily different from that on the pump, and the pump and turbine being concentric with each other, the stream of fluid going through the vanes of the redirector will impress on the latter a moment equal to the difference between the moments of the pump and turbine respectively. This may be effected by arranging the redirector in any one of the three ways stated, namely, between the turbine exit and the pump entry, Fig. 3; or between the pump exit and the turbine entry, Fig. 4; or in both locations, Fig. 2.

I. The quantity $Cu'$, (Fig. 3) depends on the angle $a'$ between the direction of exit of the oil (C') and the tangential line U'. The vanes $12^a$ change the direction of flow of the oil passing from the turbine to the pump and can be set to decrease the angle $a'$ and thus to increase the tangential component thereof, $Cu'$.

By making the vanes $12^a$ movable, as illustrated in Fig. 3, there is an acceleration or a diminution of the quantity $Cu'$ as the flow of oil is increased or diminished. The minimum effect is shown in full lines. When the flow of the oil increases it presses the pivoted ends O to the left so that the vanes assume the dotted line position, the pins $14^a$ in the free ends of the vanes sliding in the slots $15^a$. In the dotted line position, the direction of escape of the oil is such as to make a smaller angle $a'$ and thus to increase the quantity $Cu'$.

II. For a diminution of the quantity $Cu^2$ at the exit of the pump, Fig. 4, we assume that the speed of the pump $u^2$ is constant. If $Cu^2$ is to be less than $u^2$, that is, if the tangential velocity of the oil is to be less than the velocity of the pump itself, the vanes 5 must be inclined backward so that the projection $5^a$ thereof makes an angle $b^2$ greater than 90 degrees with the tangential line.

At the same time, the quantity $Cu^3$ at the turbine entrance must increase because we are assuming an increased force on the turbine. Therefore, we must have the vanes $11^b$ of the redirector set at such an angle as to direct the flow into the turbine along a line $C^3$ which makes an angle $a^3$ with a tangential line less than 90 degrees, and so much less as to secure the necessary length of the tangential component $Cu^3$. The quantity $C^3$ which represents the speed of arrival of the oil at the turbine (and the tangential component $Cu^3$ thereof) will be increased proportionately to the quantity of oil. The angle $a^3$ may also be made to vary, diminishing as the quantity increases, by making the vanes $11^b$ movable under the pressure of the flowing oil.

Thus we get the desired effect by placing the redirector between the pump exit and turbine entry in connection with a pump with the free ends of its vanes at such an angle that their extension $5^a$ makes an angle greater than 90 degrees with the tangential advance of the turbine. The pump vanes may have their exit ends fixed as shown, or may be of other known or suitable constructions.

III. For an increase of the quantity $Cu'$ and a simultaneous decrease of the quantity $Cu^2$, it is only necessary to use a redirector of the general character shown in Fig. 2 with vanes at both points, an outer ring of vanes $11^b$ between the pump outlet and the turbine inlet, and an inner ring of vanes $11^b$ between the turbine outlet and the pump inlet; using the angular dispositions of the vanes previously described at the respective locations.

It is also to be noted that as the shell of the redirector is held fixed, the speed of the turbine will increase beyond that of the pump if the moment of the load on the turbine falls below that of the pump. In that case the system works as an automatic accelerator; as well as an automatic speed reducing device when the load on the turbine increases. In reality, the turbine then becomes the counterpart of a real series electric motor which tends of its own accord to work at constant power. This is due merely to the pressing of the guide vanes between the exit from the turbine and the entry into the pump, for example.

If it is not desired to take advantage of the property of accelerating the speed as above, and if, further, it is desired to decrease the losses which correspond to that system, the shell of the redirector will be mounted to rotate, as by means of the free wheel 18, but will be held fast as long as the moment of forces on the turbine is greater than that on the pump and will be released as soon as the moment on the turbine tends to become smaller. As soon as this tendency occurs, the redirector is not subjected to any substantial rotary forces and the whole combination functions as a simple coupling.

What I claim as my invention and desire to secure by Letters Patent is:

1. An hydraulic transmission including in combination two devices, namely, a rotary pump, a turbine operated by the fluid discharged from the pump and arranged to return the fluid to the pump, and a redirector between said two devices, the pump, the turbine and the redirector being co-axial with one another and the redirector having vanes which change the direction of the fluid in its passage from one to the other of said devices, the opposite ends of the redirector vanes being pivotally mounted on a pair of adjacent rings with one of said pivots movable axially with respect to its ring, said rings being held in starting angular position by yielding means between them, which permit the vanes to be moved to different angles under the thrust of the fluid.

2. A hydraulic transmission comprising in combination a pump having impelling blades in fixed position thereon, a turbine having impelled blades in fixed position thereon, and a redirector between each group of pump and turbine blades, said redirector blades being pivoted to vary their inclination to fluid passing between said turbine and pump blades, means automatically to vary the position of said redirector blades with changes in the relative speed of said pump and turbine, the blades of said redirector being continuous from the leading to the following edge to form continuous unbroken paths for fluid between said pump and turbine blades.

ROBERT SENSAUD DE LAVAUD.